(12) United States Patent
Crocker et al.

(10) Patent No.: US 7,680,510 B2
(45) Date of Patent: Mar. 16, 2010

(54) DIVERSITY-SWITCHED FRONT END BASE STATION TRANSCEIVER SYSTEM

(75) Inventors: Michael A. Crocker, Long Valley, NJ (US); Michael Anthony Lynch, Denville, NJ (US); Max Aaron Solondz, New Vernon, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 987 days.

(21) Appl. No.: 11/270,930

(22) Filed: Nov. 10, 2005

(65) Prior Publication Data
US 2007/0105505 A1 May 10, 2007

(51) Int. Cl.
*H04M 1/00* (2006.01)

(52) U.S. Cl. .............. 455/553.1; 455/78; 455/101; 455/127.4; 455/118; 455/575.7; 455/277.1; 455/88; 333/25; 333/109; 333/135

(58) Field of Classification Search .............. 455/553.1, 455/82, 78, 83, 118, 277.1, 575.7, 277.2, 455/188.1, 80, 101, 127.4, 88; 333/135, 333/109, 25
See application file for complete search history.

(56) References Cited

U.S. PATENT DOCUMENTS

| | | | | | |
|---|---|---|---|---|---|
| 5,463,406 | A | * | 10/1995 | Vannatta et al. | 343/725 |
| 5,471,146 | A | * | 11/1995 | Krayeski et al. | 324/637 |
| 5,630,213 | A | * | 5/1997 | Vannatta | 455/133 |
| 5,940,452 | A | * | 8/1999 | Rich | 375/347 |
| 5,983,081 | A | * | 11/1999 | Lehtinen | 455/76 |
| 6,002,920 | A | * | 12/1999 | Consolazio et al. | 455/82 |
| 6,014,551 | A | * | 1/2000 | Pesola et al. | 455/86 |
| 6,018,555 | A | * | 1/2000 | Mahany | 375/347 |
| 6,018,651 | A | * | 1/2000 | Bruckert et al. | 455/277.1 |
| 6,021,318 | A | * | 2/2000 | Schaffer | 455/78 |
| 6,023,615 | A | * | 2/2000 | Bruckert et al. | 348/14.08 |
| 6,118,378 | A | * | 9/2000 | Balch et al. | 340/572.7 |
| 6,728,517 | B2 | * | 4/2004 | Sugar et al. | 455/73 |
| 6,922,549 | B2 | * | 7/2005 | Lyons et al. | 455/67.13 |
| 6,937,677 | B2 | * | 8/2005 | Strolle et al. | 375/347 |
| 7,006,809 | B2 | * | 2/2006 | Petrov et al. | 455/276.1 |
| 7,092,676 | B2 | * | 8/2006 | Abdelgany et al. | 455/76 |
| 7,092,679 | B2 | * | 8/2006 | Khorram | 455/78 |
| 7,116,952 | B2 | * | 10/2006 | Arafa | 455/132 |
| 7,142,824 | B2 | * | 11/2006 | Kojima et al. | 455/78 |
| 7,184,727 | B2 | * | 2/2007 | Poilasne et al. | 455/179.1 |
| 7,313,368 | B2 | * | 12/2007 | Wu et al. | 455/73 |

(Continued)

*Primary Examiner*—Marceau Milord
(74) *Attorney, Agent, or Firm*—McCormick, Paulding & Huber LLP (57) ABSTRACT

A transceiver system for RF communications in a wireless network includes a transceiver having first and second receivers and a transmitter. The first receiver and transmitter are connected to first antenna section. The second receiver is switchable between connection to a second antenna section and connection to the first antenna section. In a dual diversity mode, the second receiver is connected to the second antenna section, and the two receivers are tuned to the same RF channel set. Thus, multi-path faded signals in the RF channel set are received at the two antenna sections. In a cross-connected mode, two of the transceivers are used together, with the second receiver in each being connected to the first antenna section. Each transceiver supports one antenna, and the receivers in each transceiver (as well as the transmitters) are respectively tuned to different RF channel sets. Thus, system capacity is doubled in conjunction with diversity reception.

15 Claims, 8 Drawing Sheets

U.S. PATENT DOCUMENTS 7,324,794 B2 * 1/2008 Chari et al. ................. 455/130
7,444,166 B2 * 10/2008 Sahota .................... 455/553.1
7,532,871 B2 * 5/2009 Nishimura et al. .......... 455/130

* cited by examiner

DIVERSITY-SWITCHED FRONT END BASE STATION TRANSCEIVER SYSTEM

FIELD OF THE INVENTION

The present invention relates to wireless communications and, more particularly, to radio frequency transceivers.

BACKGROUND OF THE INVENTION

Modular growth of a wireless network base station's voice or data-carrying capability often involves adding both more RF (radio frequency) transmit power as well as more RF bandwidth for transmission and reception. Designing a cost effective radio transceiver that can be easily scaled to support both low power and a low number of RF carriers, as well as allowing for the addition of both power and carriers, can be difficult. In order to reduce costs, narrower band transmitters and receivers are oftentimes designed and utilized, rather than wideband transmitters and receivers that are more easily scaled.

Often, a single radio transceiver may include two receivers in the reverse link band for reception diversity, plus a single transmitter for forward link transmissions, with no provisions for transmit diversity. Older designs (e.g., analog FM, TDMA, and GSM) would add capacity by adding many parallel transceivers per sector. This requires either low power combining before a single high power multi-carrier linear amplifier (e.g., a feed-forward amplifier), a separate power amplifier for each RF carrier followed by a multiplexer combiner filter (e.g., a tunable cavity type RF filter), or separate transmit antennas for each carrier. Alternatively, more expensive multi-carrier transceivers may be used to support growth for wideband spread spectrum-type air interfaces such as UMTS or CDMA (code division multiple access). These devices are more costly in that they support wider bandwidths to begin with, and only become cost effective after capacity is added and the transmitted carriers occupy more of the RF bandwidth. Often, the transmitter portion supports multi-carrier transmission because post amplification high power combining is neither feasible nor cost effective for wideband CDMA-type signals where it is difficult to build cavity type combiners for such wide carriers bandwidths, and where using multiple transmit antennas is cost prohibitive.

SUMMARY OF THE INVENTION

An embodiment of the present invention relates to a radio frequency ("RF") transceiver system for RF communications on a wireless network or the like. The transceiver system includes a first receiver connected to a first antenna section. (By "antenna section," it is meant one or more antenna related components, such as an antenna gain stage, antenna port, antenna lead, and/or antenna.) The transceiver further includes a second receiver that is configured for switched connection to the first antenna section or to a second antenna section. The first and second receivers are configured for tuning to different RF channel sets. (By "channel set," it is meant a designated frequency range for reception, and either the same or a different designated frequency range for transmission, depending on network configuration.) The transceiver may also include a transmitter connected to the first antenna section.

In operation, according to an additional embodiment, the first receiver is tuned to a first RF channel set. The second receiver is selected for switched connection to the first antenna section or to the second antenna section. In other words, the second receiver is switched for connection to the first antenna section or for connection to the second antenna section, if necessary. If the second receiver is selected for connection to the second antenna section, it is tuned to the first RF channel set for diversity reception. Otherwise, the second receiver is tuned to a second RF channel set for use in a cross-connected mode.

For example, in another embodiment, a user selects one of a first mode and a second mode for operation of the transceiver. In the first mode, the first and second receivers are tuned to the same RF channel set for respective receipt of signals through first and second antennas. The first mode may be selected by switching the second receiver for connection to the second antenna section. This first mode is deployed to accomplish diversity reception on the single RF channel set using a single transceiver. In the second mode, the first and second receivers are tuned to different RF channel sets for receipt of signals through the first antenna. The second mode may be selected by switching the second receiver for connection to the first antenna section. This second mode is deployed to allow simultaneous reception of both RF channel sets from a common antenna.

In another embodiment, two of the transceivers are used together. For example, each transceiver may include two receivers. The first receiver is connected to a first antenna section, and the second receiver may be switched for connection to the same first antenna section or to a second antenna section. Both transceivers are selected for operation in the second mode described above, such that the two receivers in each transceiver are respectively connected to the same (first) antenna section in that transceiver. The two separate transceivers each support a single antenna. The two receivers in the first transceiver are tuned to two different RF channel sets, and the two receivers in the second transceiver are respectively tuned to the same two RF channel sets. In this manner, the two transceivers may be deployed together using the second mode to receive and transmit both RF channel sets while still supporting diversity reception.

In another embodiment, the transceiver components are housed in modular housings for installing at a network base station or the like. In the first mode, a single transceiver is used by itself for purposes of diversity reception on a single RF channel set. For the second mode, for expanding network communications capacity, two transceivers are used together (both being selected for operation in the second mode) for double-bandwidth communications (or the like) and diversity reception on two RF channel sets.

BRIEF DESCRIPTION OF THE DRAWINGS

The present invention will be better understood from reading the following description of non-limiting embodiments, with reference to the attached drawings, wherein below.

DETAILED DESCRIPTION

With reference to FIGS. 1A-7, an embodiment of the present invention relates to a diversity-switched transceiver system 10 for carrying out radio-frequency ("RF") communications on a wireless communications network 12 or elsewhere. For example, the transceiver system 10 may be utilized on or in conjunction with a network base station 14 for wireless communications with a number of distributed wireless access terminals 16a, 16b. The access terminals 16a, 16b may include, for example, mobile phones, wireless PDA's, wireless devices with high-speed data transfer capabilities, such as those compliant with "3-G" or "4-G" standards, "WiFi"-equipped computer terminals, and the like. The base station 14 will typically be connected to one or more controllers 18 (e.g., a base station controller, mobile switching center, and/or radio network controller) which act as the interface between the wireless/RF end of the wireless network 12 and the rest of the network, including performing the signaling functions necessary to establish calls and other data transfer to and from the access terminals 16a, 16b. The wireless network 14 may be connected to one or more external networks such as a public switched telephone network ("PSTN") 20, or to the Internet or other Internet Protocol (IP)-based or other packet data network.

The transceiver system 10 may be used for wireless communications on different types of base stations 14 and wireless networks 12. For example, the wireless network 12 may be a CDMA2000® (IS-2000) high rate packet data network. CDMA2000® is a "3-G" (third generation) mobile telecommunications protocol/specification configured for the high-speed wireless transmission of both voice and non-voice data using IP data packets or the like. CDMA-based networks utilize a CDMA spread-spectrum multiplexing scheme for wireless communications. In CDMA communications, transmissions from the access terminals 16a, 16b to the base stations 14 are across a single RF channel known as the reverse link, e.g., a 1.25 MHz bandwidth centered at a first designated frequency. Generally, each access terminal is allocated the entire bandwidth all of the time, with the signals from individual access terminals being differentiated from one another using an encoding scheme. Transmissions from the base stations to the access terminals are across a similar RF channel (e.g., 1.25 MHz centered at a second designated frequency) known as the forward link. The forward and reverse links may each comprise a number of traffic sub-channels and signaling or control sub-channels, the former primarily for carrying data, and the latter primarily for carrying the control, synchronization, and other signals required for implementing CDMA communications. The wireless network 12 may be geographically divided into contiguous cells, each serviced by a base station, and/or into sectors, which are portions of a cell typically serviced by different antennae/transceivers supported on a single base station.

The transceiver system 10 includes at least one transceiver 22a, 22b, which is shown in more detail in FIGS. 2-5. The transceiver 22a, 22b includes a first receiver module 24, a second receiver module 26, and a transmitter module 28. The receiver and transmitter modules 24, 26, 28 will typically be housed together in a modular transceiver housing 30, such as a compact chassis or support frame configured for convenient, modular deployment at the base station 14. The transceiver 22a, 22b supports two modes: a dual diversity mode (FIGS. 1A, 2, and 3) and a cross-connected mode (FIGS. 1B and 4-6). In the dual diversity mode, one of the transceivers 22a is used alone to support one cell or sector with receiver diversity. Here, both receiver modules 24, 26 are tuned together to the same RF channel set 70 in order to support dual diversity reception from two antennas 32a, 32b. In the cross-connected mode, a second transceiver 22b is added, with each transceiver 22a, 22b supporting one of the two antennas 32a, 32b. In each transceiver 22a, 22b, the receivers 24, 26 are connected to the same antenna, but are tuned to different RF channel sets 76, 78. In this manner, the two transceivers 22a, 22b are used together to either double the communications capacity or to accommodate discontiguous RF carriers over a bandwidth wider than a single receiver or transmitter can support. Reception diversity is also supported.

Referring back to FIG. 2, the first and second receiver modules 24, 26 each respectively include a receiver 34a, 34b and an antenna gain stage 36a, 36b. The antenna gain stage 36a, 36b includes standard components such as a reception bandpass filter ("RX BPF") 38a, 38b and a low noise amplifier ("LNA") 40a, 40b, which together act to amplify the low power signals of interest arriving at the antenna 32a, 32b, e.g., signals within a certain bandwidth. More specifically, although an antenna typically has its own frequency response, the reception bandpass filter 38a, 38b is provided for further filtering the signals received at the antenna. The low noise amplifier 40a, 40b provides adequate signal gain without significantly degrading the signal, to alleviate the signal-to-noise ratio of subsequent stages. The antenna gain stage 36a, 36b may be directly connected to an antenna 32a, 32b or antenna lead, or it may be removably connected thereto by way of an antenna port 42a, 42b. The antenna port 42a, 42b is a standard connector or receptacle configured for securely but removably connecting the antenna gain stage 36a, 36b to an antenna 32a, 32b or antenna lead. For example, it may the case that the antennas 32a, 32b are mounted high up on a base station tower, with antenna leads being routed down the tower and into a secure room or other enclosure that houses and protects the base station electronics equipment, such as the transceiver system 10, from the weather. Since such equipment may need to be switched out from time to time, antenna lead(s) are typically removably connected to the equipment.

Figure 2:
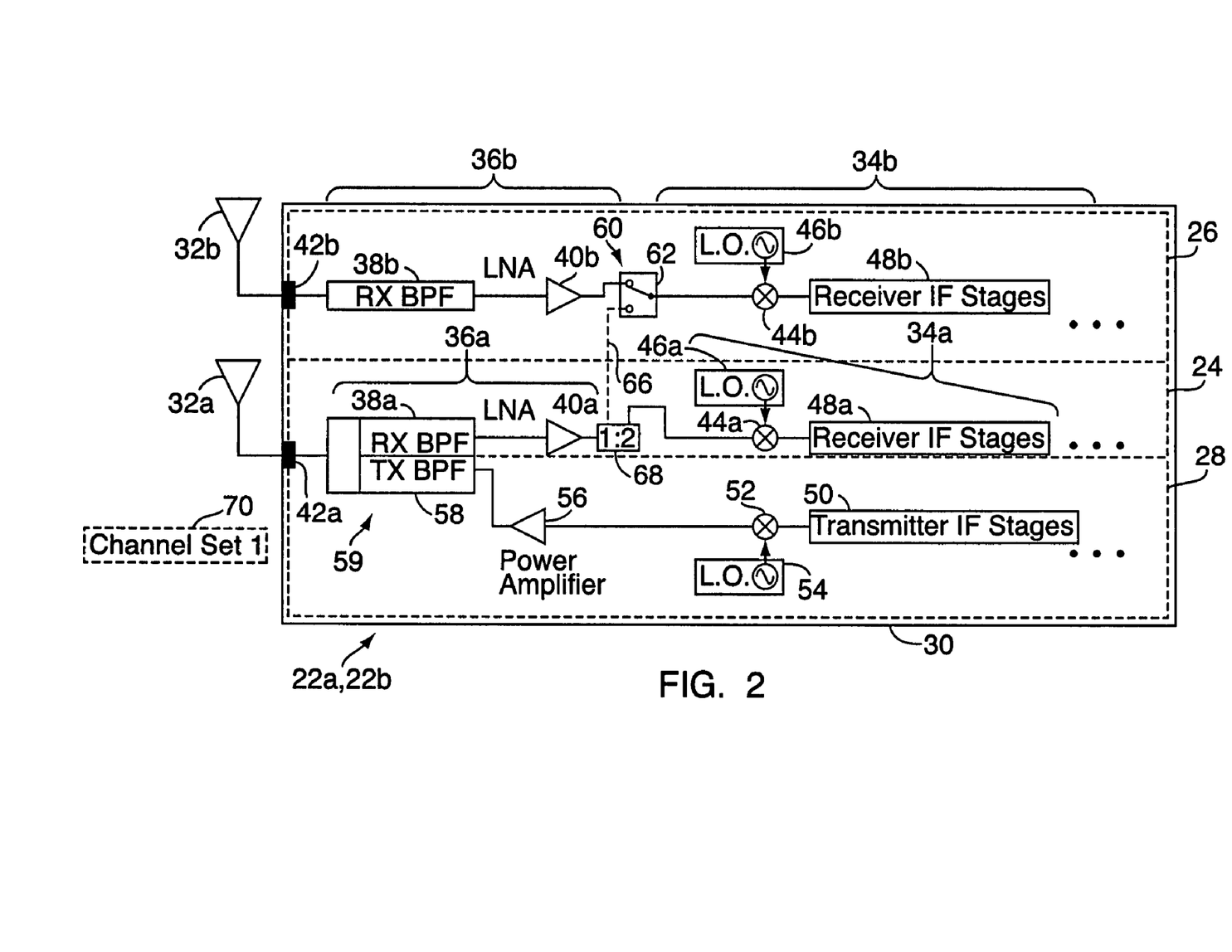
FIGS. 2 and 4 are schematic diagrams of a first embodiment of a transceiver portion of the transceiver system.

The receiver portion 34a, 34b of each receiver module 24, 26 includes a mixer 44a, 44b, a local oscillator circuit ("LO") 46a, 46b, and one or more receiver IF (intermediate frequency) stages 48a, 48b. The outputs of the LO circuit 46a, 46b and the antenna gain stage 36a, 36b are fed into the mixer 44a, 44b. The mixer 44a, 44b and LO circuit 46a, 46b translate the signals received from the antenna gain stage 36a, 36b from a high carrier frequency down to an intermediate frequency for further processing by the IF stages 48a, 48b in a standard manner. The receiver portions 34a, 34b are separately tunable for tuning the receivers either to the same RF channel set for the dual diversity mode or to different RF channel sets for the cross-connected mode.

The transmitter module 28 includes standard RF transmission components such as one or more IF stages 50 inputted into a mixer 52, an LO circuit 54 whose output is connected to the mixer 52, a power amplifier 56, and a transmission bandpass filter ("TX BPF") 58. The transmission bandpass filter 58 and the reception bandpass filter 38a of the first receiver module 24 are integrated by way of a duplexer 59 for common connection to an antenna port 42a or otherwise.

The receiver modules 24, 26 and transmitter module 28 are shown in the figures in a simplified manner for illustration purposes. The receiver modules 24, 26 and transmitter module 28 may include additional or alternative standard components from those shown in the figures, for the standard processing of RF signals.

The second receiver module 26 further includes a switching element 60 disposed between the antenna gain stage 36b and receiver 34b. The switching element 60 may be a switch 62 (FIG. 2), e.g., a single-pole double-throw switch, a jumper 64 (FIG. 3), or the like. The switching element 60 may be manually controlled or electrically controlled. Depending on the state of the switching element 60, the first and second receiver modules 24, 26 may be electrically connected by a lead 66 that runs between the switching element 60 and a splitter 68 in the first receiver module 24. The splitter 68 is disposed between the first receiver module's antenna gain stage 36a and receiver 34a. The switching element 60 allows the receiver portion 34b of the second receiver module 26 to be selectively connected to the antenna section of either the second receiver module 26 (for the dual diversity mode), or the first receiver module 24 (for the cross-connected mode). Since the configuration of the antenna stages may vary, as may the manner in which antennas are connected to the receiver modules, the term "antenna section" is used herein to refer to the one or more antenna related components, such as the antenna gain stage, antenna port, antenna lead, and/or antenna.

For the dual diversity mode, the receiver portion 34b of the second receiver module 26 is switched, by way of the switching element 60, for connection to the antenna section of the second receiver module 26. As shown in FIG. 2, for example, the switch 62 is thrown so that the receiver 34b is connected to the antenna gain stage 36b. Similarly, with reference to the embodiment in FIG. 3, the jumper 64 is switchably configured for connecting the receiver 34b to the antenna gain stage 36b. In operation in the dual diversity mode, with reference to FIGS. 1A and 2, a single transceiver 22a is used by itself, with the first and second antennas 32a, 32b respectively connected to the receiver modules' antenna gain stages 36a, 36b by way of the antenna ports 42a, 42b. The receivers 34a, 34b are similarly tuned to the same RF channel set 70 through control of the LO circuits 46a, 46b. The transmitter 28 is also tuned to the channel set 70. (By "channel set," it is meant a designated frequency range for reception, and either the same or a different designated frequency range for transmission, depending on network configuration. For example, in CDMA communications the forward and reverse link frequency bandwidths for a designated carrier would be considered a channel set.)

Figure 1A:
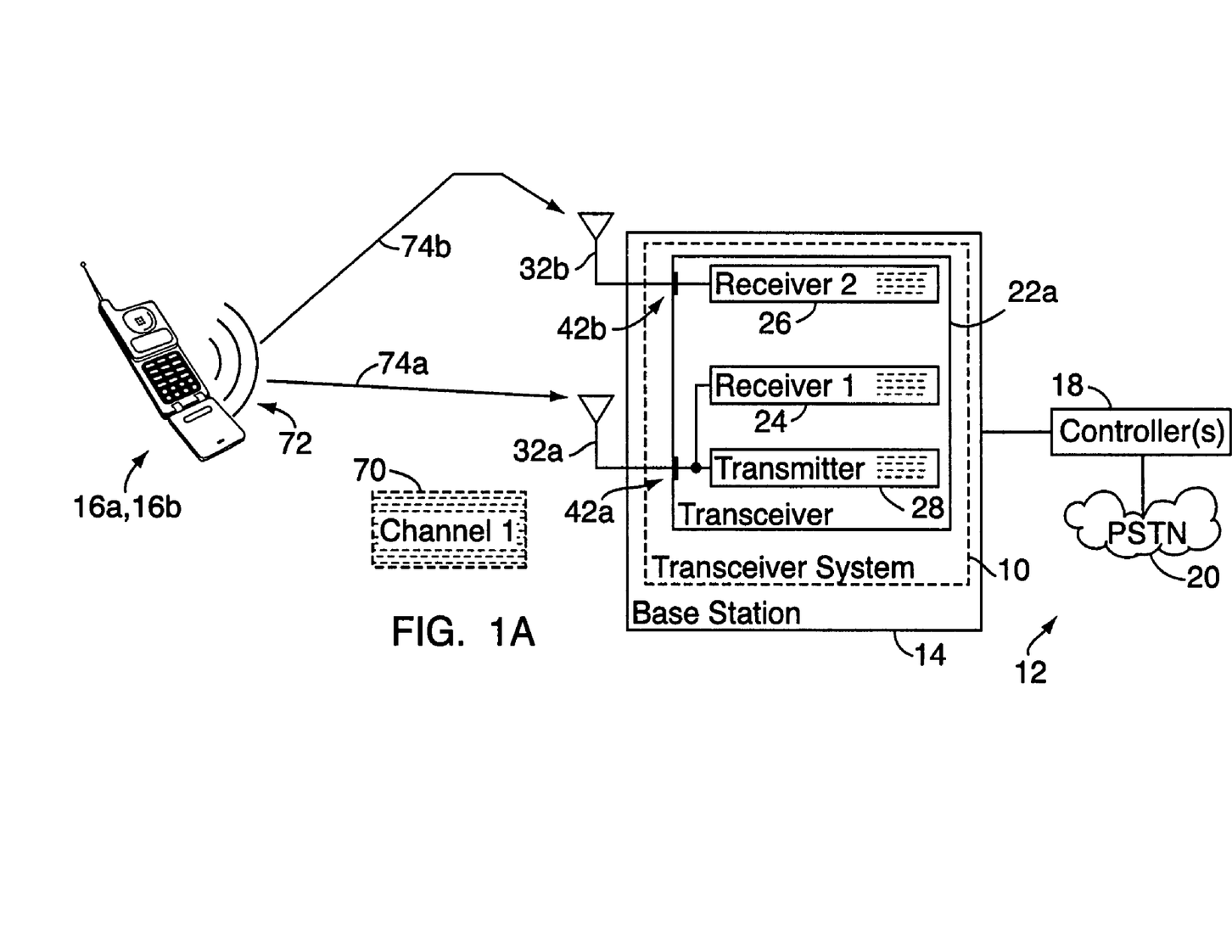
FIG. 1A is a schematic diagram of a transceiver system according to an embodiment of the present invention.
Figure 3:
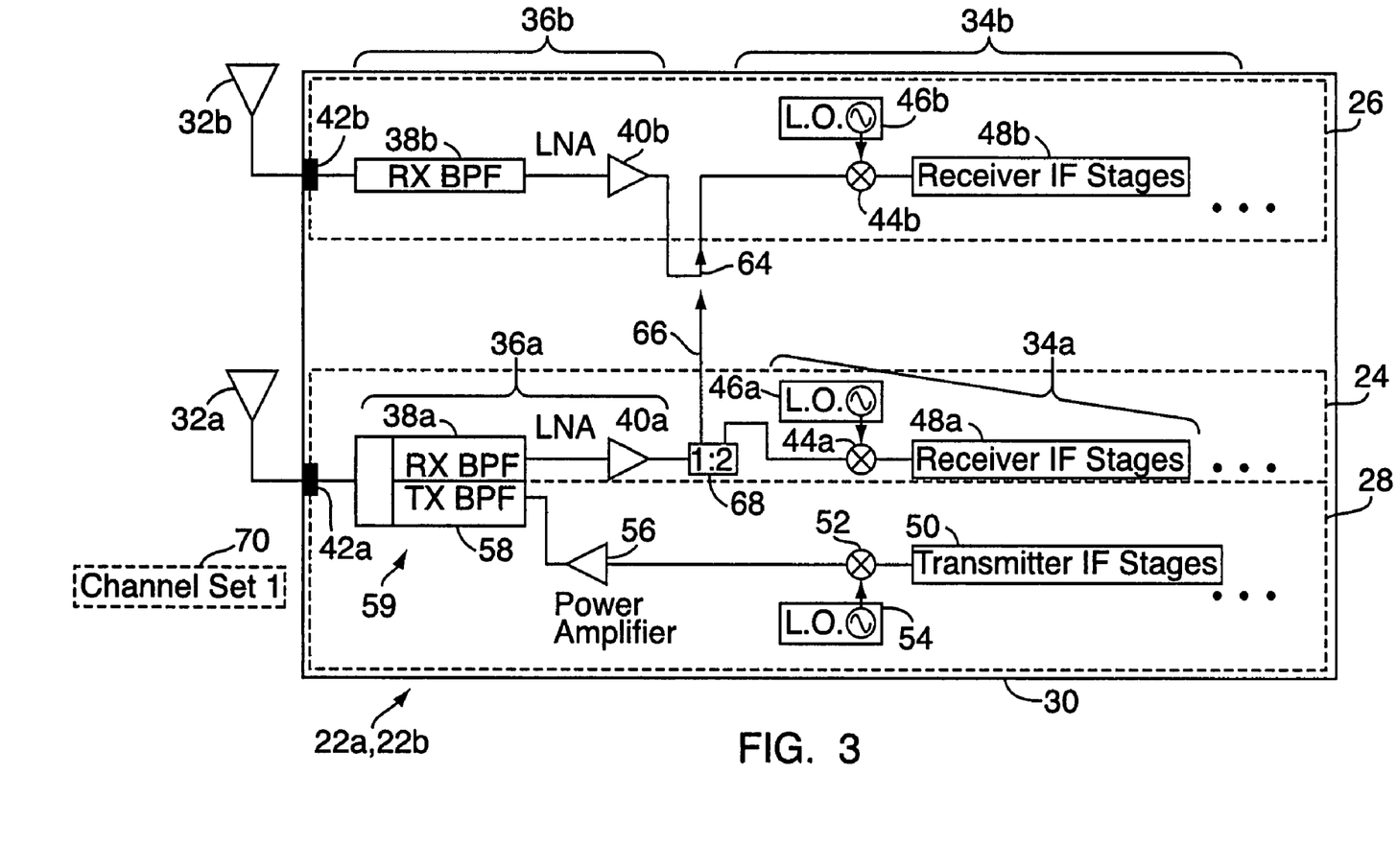
FIGS. 3 and 5 are schematic diagrams of a second embodiment of the transceiver.
Figure 4:
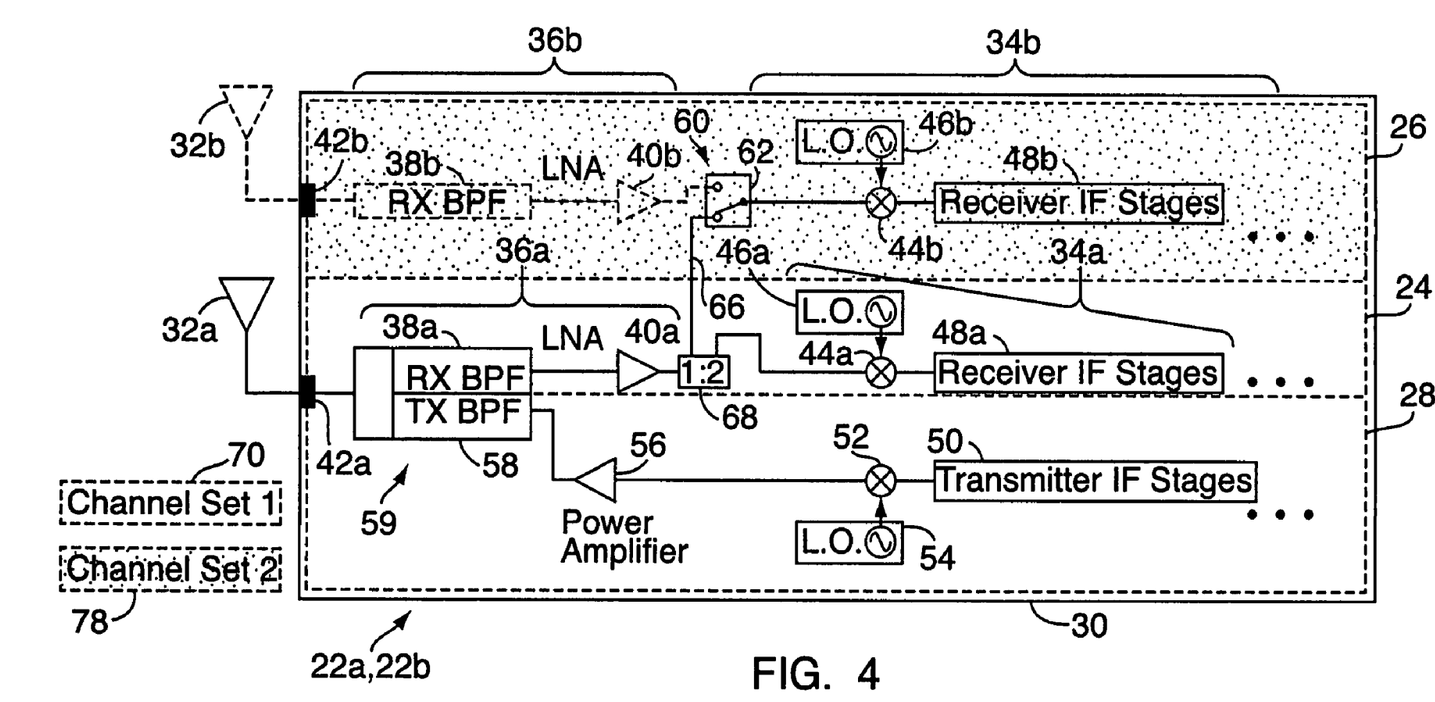
Figure 5:
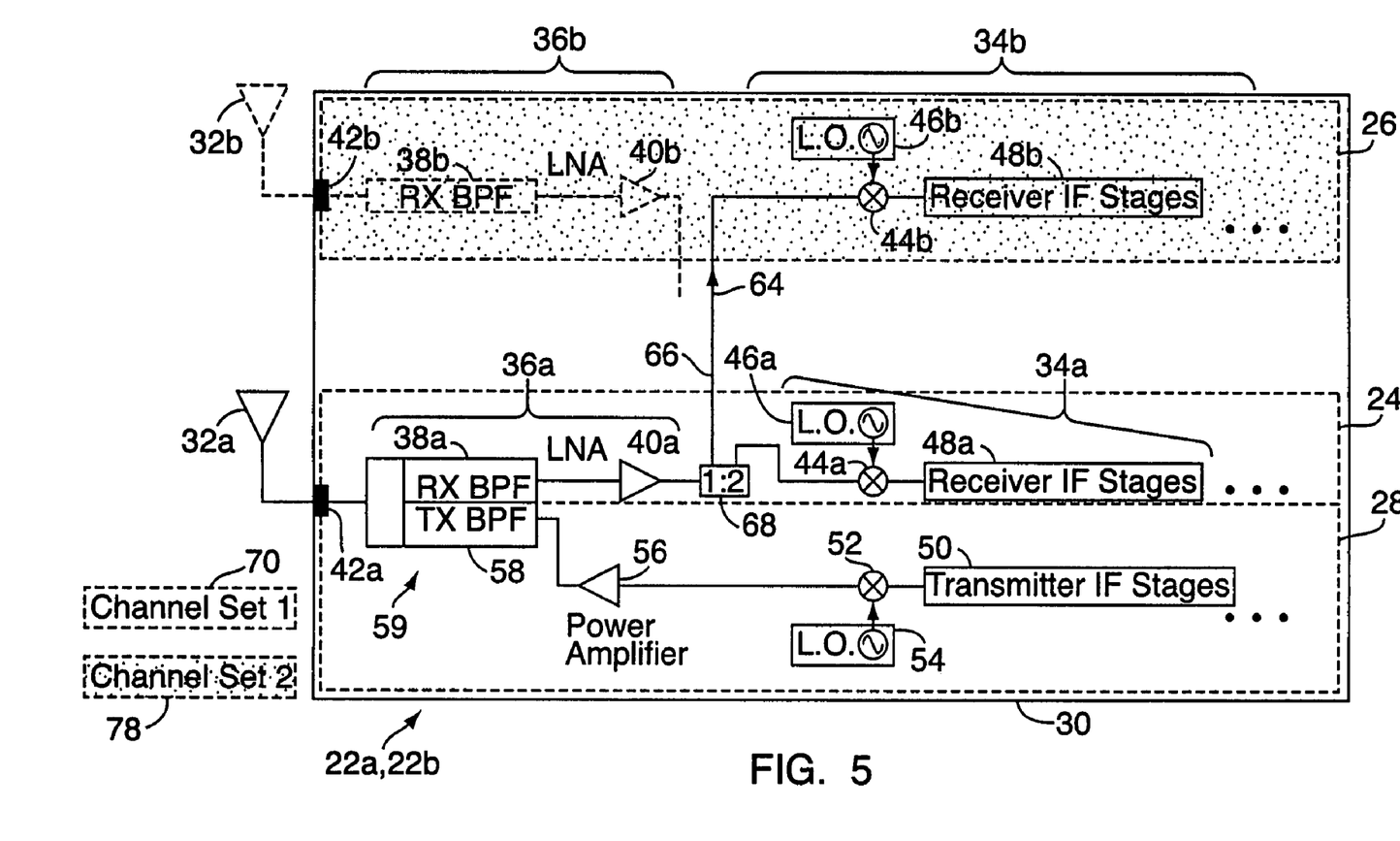

With the receiver modules 24, 26 tuned to the same RF channel set 70, the two antennas 32a, 32b act as diversity antennas. For example, with reference to FIG. 1A, it is oftentimes the case that when a signal 72 is transmitted from a source, e.g., a wireless access terminal 16a, 16b, a portion of the signal reflects off nearby objects such as buildings and geographical features. Thus, instead of a base station 14 receiving a single signal, two or more slightly varying signals 74a, 74b are received, each with its own degree of attenuation and delay. This phenomenon is known as multi-path fading, and can result in variations in signal strength at the receiver, higher bit error rates, and the like. However, with the transceiver 22a in the dual diversity mode as shown in FIGS. 1A, 2, and 3, fading does not occur simultaneously at both antennas 32a, 32b since the two necessarily occupy at least slightly different positions. Therefore, enough output is almost always available from one of the antennas to provide a useful signal. The antennas 32a, 32b may be especially configured for diversity reception, including optimizing the separation distance between the antennas, polarization diversity, different slants, etc.

To configure the transceiver 22a, 22b for use in the cross-connected mode, the switching element 60 is operated for connecting the second receiver module 26 to the antenna section, e.g., the antenna gain section 36a, of the first receiver module 24. In the embodiment shown in FIG. 4, this is done by actuating the switch 62. In the embodiment shown in FIG. 5, this is done by appropriately configuring the jumper 64. In this configuration, the antenna gain stage 36b of the second receiver module 26 is not used. Instead, signals outputted from the antenna gain stage 36a of the first receiver module 24 are routed to the receivers 34a, 34b of both receiver modules 24, 26 respectively, by way of the splitter 68.

Figure 1B:
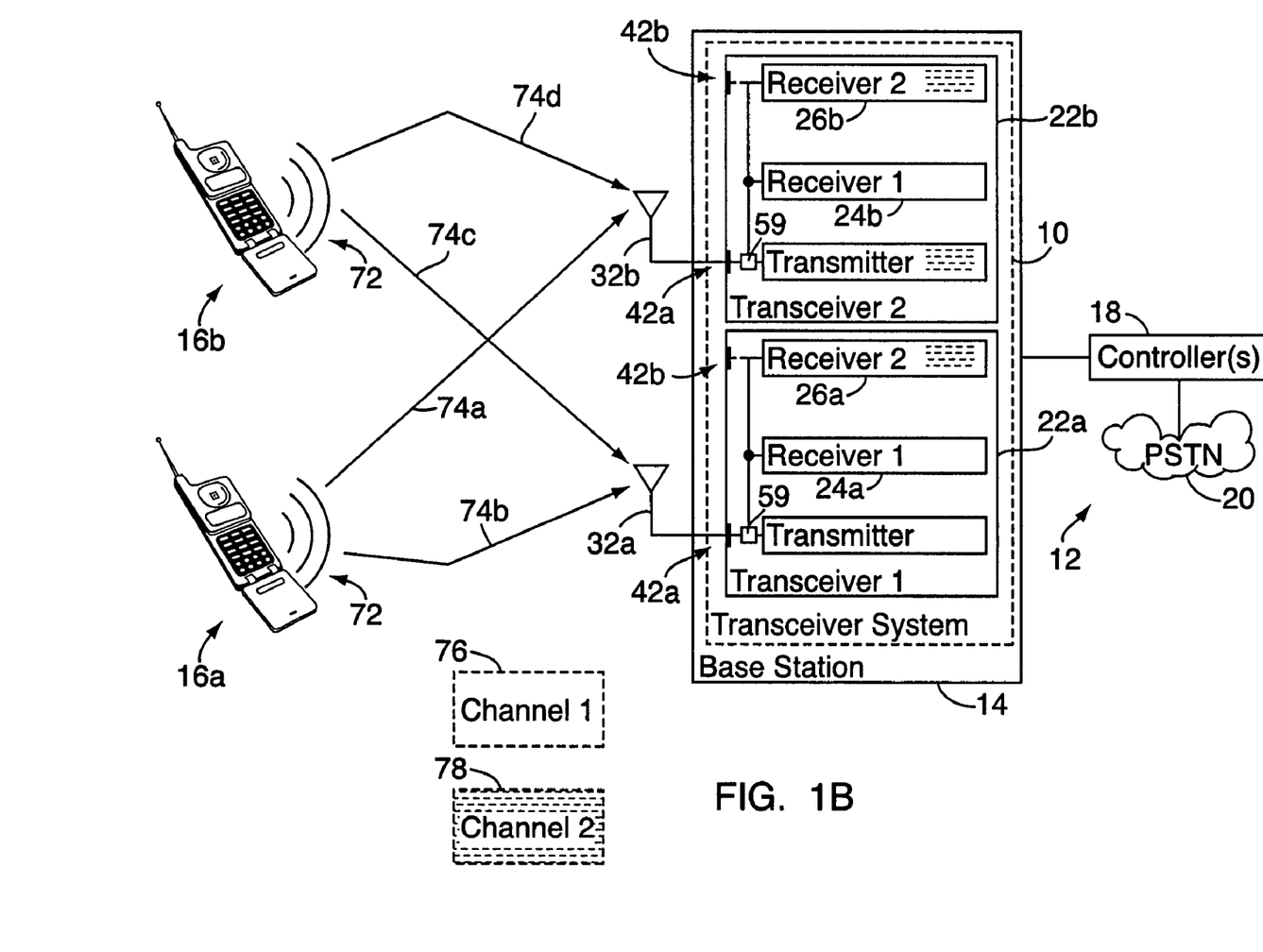
FIGS. 1B and 6 are schematic diagrams of an additional embodiment of the transceiver system.
Figure 6:
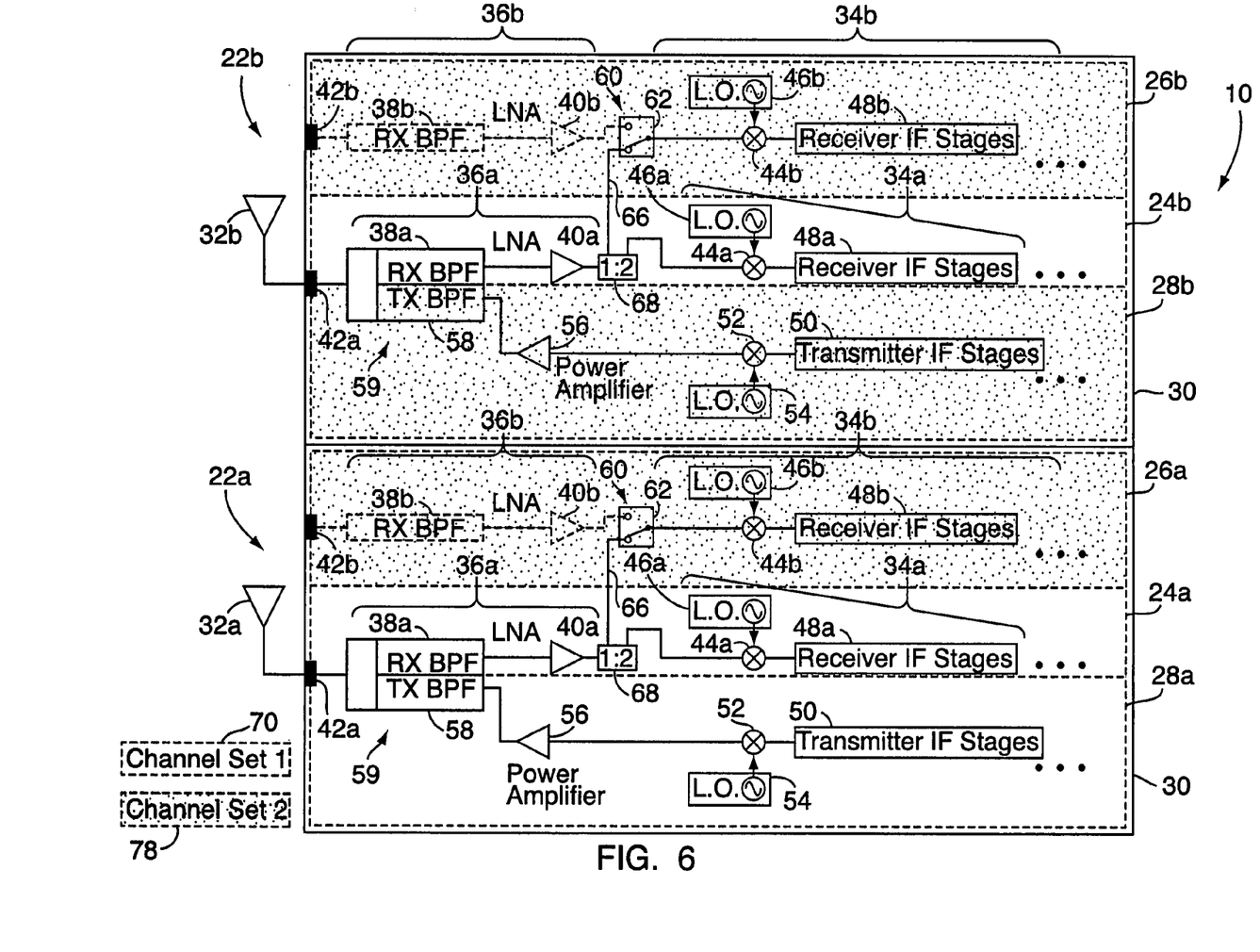

For the cross-connected mode, two transceivers 22a, 22b are used in combination, as shown in FIGS. 1B and 6, with each being configured for use in the cross-connected mode as described above. The first antenna 32a is connected to (or remains connected to) the first transceiver 22a. The second antenna 32b is disconnected from the first transceiver 22a, if necessary, and is connected to the second transceiver 22b. Additionally: i) the transmitters 28a, 28b are respectively tuned to first and second RF channel sets 76, 78; ii) one of the receivers in each transceiver is tuned to the first RF channel set 76; and (iii) the other receiver in each transceiver is tuned to the second RF channel set 78. For example, in FIG. 6 the first receiver module 24a and transmitter 28a of the first transceiver 22a are tuned to the first RF channel set 76, as is the first receiver module 24b of the second transceiver 22b. Also, the transmitter 28b and second receiver module 26b of the second transceiver 22b are tuned to the second RF channel set 78, as is the second receiver module 26a in the first transceiver 22a.

In operation, the two transceivers 22a, 22b provide double bandwidth reception, e.g., twice the bandwidth provided by a single transceiver. For example, the first and second RF channel sets 76, 78 may each have a 1.25 MHz or other bandwidth centered at different frequencies. Additionally, since two antennas 32a, 32b are used, each being connected to two receivers respectively tuned to the two RF channel sets 76, 78, diversity reception is also supported for the two channel sets. For example, with reference to the configuration in FIG. 1B, multi-path fading signals 74a, 74b from an access terminal 16a tuned to the first RF channel set 76 are received by the first receiver module 24a in the first transceiver 22a and by the first receiver module 24b in the second transceiver 22b. Similarly, multi-path fading signals 74c, 74d from an access terminal 16b operating in the second RF channel set 78 are received by the second receiver module 26a in the first transceiver 22a and by the second receiver module 26b in the second transceiver 22b.

Figure 7:
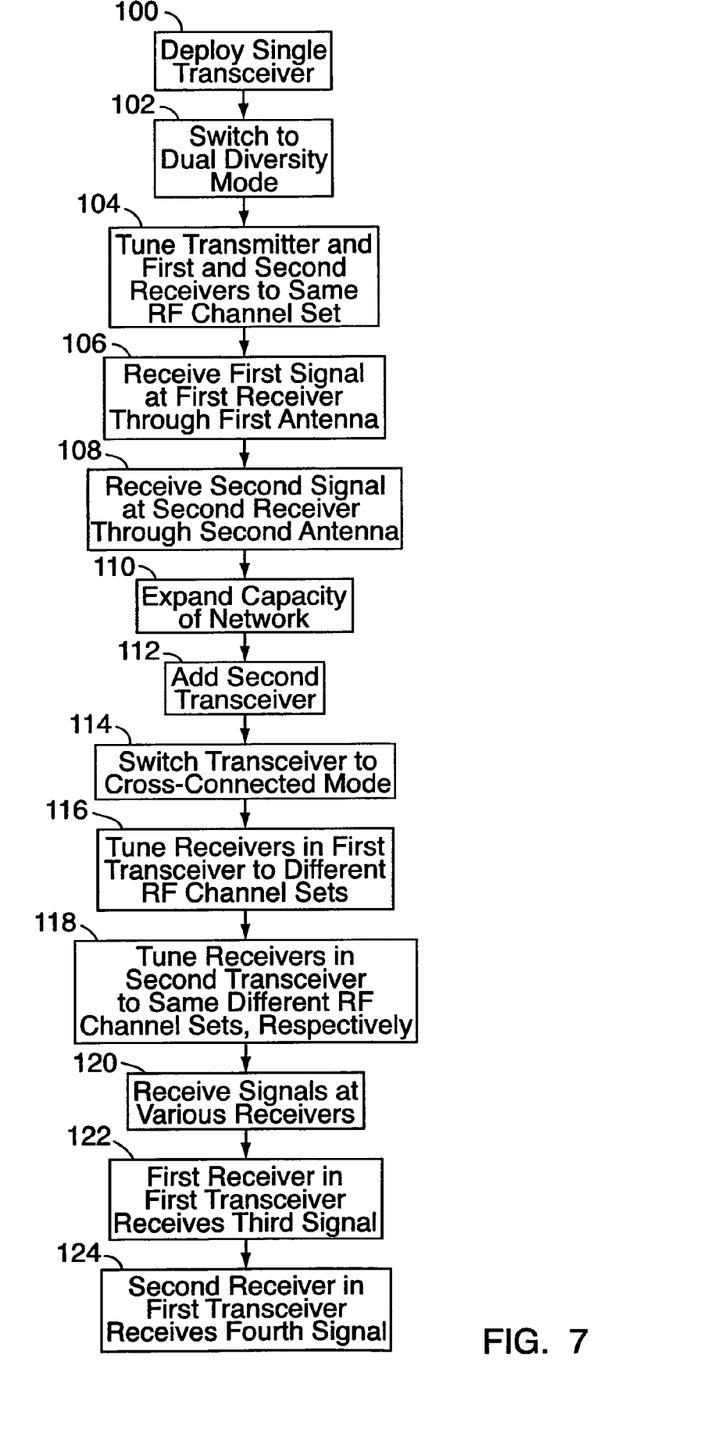
FIG. 7 is a flow chart illustrating operation of an embodiment of the transceiver system.

FIG. 7 summarizes the operation of the transceiver system, as well as the manner in which the transceiver system may be used for network growth through modular expansion of base station capacity. At Step 100, a single transceiver 22a as shown in FIGS. 1A, 2, or 3 is deployed. At Step 102, this first transceiver is switched to the dual diversity mode. This may be done according to either of the two embodiments described above, or in a similar manner. For example, as shown in FIG. 2, the transceiver may be switched to the dual diversity mode by actuating the switching element 60 disposed between the antenna section and receiver portion 34b of the second receiver 26 in the transceiver. Alternatively, the transceiver may be switched to the dual diversity mode by deploying a jumper connection as shown in FIG. 3. In either embodiment, for operation in the dual diversity mode, at Step 104 the two receivers 24, 26 are tuned to the same RF channel set, as is the transmitter 28. As noted above, this means that the two receivers are tuned to the same reverse link frequency bandwidth and the single transmitter is tuned to a corresponding forward link frequency bandwidth, depending on the configuration of the wireless network (e.g., the transmitter is tuned to a designated frequency bandwidth for forward link/downlink transmissions). At Steps 106 and 108, the first and second receivers 24, 26 receive first and second signals 74a, 74b (e.g., multi-path faded signals originating from a common source signal 72) through the first and second antennas 32*a*, 32*b*, respectively.

At Step 110, the operator of the network chooses to expand the capacity of the network. This may be accomplished in Step 112 by adding a second transceiver 22*b*. For doing so, the system is configured as shown in FIGS. 1B and 6. In FIG. 6, for example, the first antenna 32*a* remains connected to the first transceiver 22*a*. The second antenna 32*b*, however, is disconnected from its original connection to the second antenna port 42*b* of the first transceiver 22*a* (e.g., the antenna port 42*b* connected to the antenna gain stage 36*b* of the second receiver portion 26*a* of the first transceiver 22*a*), and is reconnected to the first antenna port 42*a* of the second transceiver 22*b* (e.g., the antenna port 42*a* connected to the filter duplexed connection 59 of receiver 24*b* and transmitter 28*b*). Here, the antenna gain stage portions of the receivers 26*a* and 26*b* have been abandoned in place in order to accommodate the use of the second transceiver 22*b* for growth of network capacity.

At Step 114, each of the pair of transceivers 22*a*, 22*b* is switched from the dual diversity mode to the cross-connected mode. This may be accomplished by either changing the position of the switch 62 from that shown in FIG. 2 to that shown in FIG. 4, or by changing the jumper 64 configuration from that shown in FIG. 3 to that shown in FIG. 5. (For example, with reference to FIG. 2, the receiver portion 34*b* of the second receiver module 26 in each transceiver is connected to the first receiver module's antenna section, e.g., to the antenna gain stage 36*a*.) Then, at Step 116, the first and second receiver modules 24*a*, 26*a* of the first transceiver 22*a* are tuned to different RF channel sets 76, 78. For example, the first receiver 24*a* may be tuned to a first frequency bandwidth for one RF reverse link carrier (e.g., a first 1.25 MHz bandwidth centered at a first frequency), and the second receiver 26*a* may be tuned to a second frequency bandwidth for a second, contiguous or discontiguous RF reverse link carrier (e.g., a second 1.25 MHz bandwidth centered at a second frequency 1.25 MHz away from the first frequency). Similarly, at Step 118, the receivers in the second transceiver 22*b* are respectively tuned to the same different RF channel sets 76, 78. In other words, one of the receivers in each transceiver 22*a*, 22*b* is tuned to a first RF channel set 76, and the other receiver in each transceiver is tuned to a second RF channel set 78. The transmitters 28*a*, 28*b* may also be respectively tuned to the RF channel sets 76, 78.

At Step 120, RF signals are received by the receivers over their respective RF channel sets on an ongoing basis. For example, at Steps 122 and 124, the two receivers 24*a*, 26*a* in the first transceiver 22*a* may receive third and fourth signals through the first antenna 32*a*. For example, the first receiver 24*a* may receive a signal 74*c* over the RF channel set 76 to which it is tuned, and the second receiver 26*a* may receive a signal 74*b* over the different RF channel set 78 to which it is tuned. Similarly, the first receiver 24*b* in the second transceiver 22*b* may receive a signal 74*d* over the RF channel set 76, and the second receiver 26*b* in the second transceiver 22*b* may receive a signal 74*a* over the RF channel set 78.

As should be appreciated, the transceiver system 10 is advantageous for use in wireless network applications generally, since the integrated transceiver is packaged into a single module. This is especially true for remote RF heads or the like. In the manner described herein, two transceivers can be "piggybacked" and cross-connected to offer twice the RF carriers, transmit diversity, and/or discontiguous carrier coverage, all while reusing the same standard modules 22*a*, 22*b*.

Since certain changes may be made in the above-described diversity-switched front end base station transceiver system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A radio frequency (RF) transceiver system comprising:
   a first receiver and a first transmitter connected to a first antenna section;
   a second receiver configured for switched connection to one of the first antenna section and a second antenna section, wherein the first and second receivers are configured for tuning to different RF channel sets;
   a second transmitter and a third receiver being connected to a third antenna section; and
   a fourth receiver configured for switched connection to one of the third antenna section and a fourth antenna section;
   wherein the first receiver and the second receiver are tuned to different RF channel sets when the second receiver is switched for connection to the first antenna section; and
   wherein the third receiver and the fourth receiver are tuned to the different RF channel sets to which the first and second receivers are tuned respectively.

2. The transceiver system of claim 1 wherein the first and second receivers are tuned to the same RF channel set when the second receiver is connected to the second antenna section, and to different RF channel sets when the second receiver is connected to the first antenna section.

3. The transceiver system of claim 2 wherein the first and second antenna sections, respectively, further comprise:
   first and second antenna ports; and
   first and second antennas respectively connected to the first and second antenna ports, wherein the first and second antennas are configured for diversity reception.

4. The transceiver system of claim 2 further comprising:
   at least one of a switch and a jumper for switching the second receiver between connection to the first antenna section and connection to the second antenna section.

5. The transceiver system of claim 2 wherein the first transmitter and first and second receivers are housed together in a first modular housing.

6. The transceiver system of claim 5 wherein the second transmitter and the third and fourth receivers are housed together in a second modular housing; and
   the fourth receiver is switched for connection to the third antenna section.

7. A method of radio frequency (RF) communications comprising:
   tuning a first receiver to a first RF channel set, said first receiver being connected to a first antenna section;
   selecting a second receiver for switched connection to the first antenna section, wherein the second receiver is tuned to the second RF channel set,
   tuning a third receiver to one of the first RF channel set and the second RF channel set, said third receiver being connected to a third antenna section; and
   selecting a fourth receiver for switched connection to the third antenna section, wherein the fourth receiver is tuned to the other of said one of the first RF channel set and the second RF channel set.

8. The method of claim 7 further comprising:
   selecting the second receiver for switched connection to the second antenna section, wherein the second receiver is tuned to the first RF channel set; and receiving first and second signals at the first and second receivers by way of the first and second antenna sections, respectively, wherein the first and second signals are multi-path fading signals originating from a common source signal.

9. The method of claim 7 further comprising:

respectively receiving first and second signals at the first and second receivers by way of the first antenna section, and third and fourth signals at the third and fourth receivers by way of the third antenna section, wherein the signals received by the receivers tuned to the first RF channel set are multi-path fading signals originating from a first common source signal and the signals received by the receivers tuned to the second RF channel set are multi-path fading signals originating from a second common source signal.

10. A method for expanding the capacity of a wireless network base station, said method comprising:

outfitting the base station with a first modular transceiver configured for selective operation in one of a dual diversity mode, for receiving signals in a first RF channel set by way of first and second antenna sections, and a cross-connected mode for receiving signals in the first RF channel set and a second RF channel by way of the first antenna section;

outfitting the base station with a second modular transceiver configured for selective operation in one of the dual diversity mode, for receiving signals in the first RF channel set by way of third and fourth antenna sections, and a cross-connected mode for receiving signals in the first and second RF channel sets by way of the third antenna section; and selecting the first and second modular transceivers for operation in the cross-connected mode.

11. The method of claim 10 further comprising:

selecting the first modular transceiver for operation in the dual diversity mode; and receiving first and second signals by way of first and second antennas connected to the first and second antenna sections, respectively, wherein the first and second signals are multi-path fading signals originating from a common source signal.

12. The method of claim 11 further comprising:

actuating one of a first jumper and a first switch portion of the first transceiver for selecting operation in the dual diversity mode.

13. The method of claim 10 further comprising:

connecting the second antenna section to the third antenna section of the second modular transceiver.

14. The method of claim 13 further comprising:

actuating said one of the first jumper and the first switch portion of the first transceiver for selecting operation of the first transceiver in the cross-connected mode; and actuating one of a second jumper and a second switch portion of the second transceiver for selecting operation of the second transceiver in the cross-connected mode.

15. A radio frequency (RF) transceiver system comprising:

a first receiver connected to a first antenna section;

a second receiver configured for switched connection to one of the first antenna section and a second antenna section, wherein the first and second receivers are configured for tuning to different RF channel sets;

a first transmitter connected to the first antenna section;

a second transmitter and a third receiver both connected to a third antenna section; and a fourth receiver configured for switched connection to one of the third antenna section and a fourth antenna section, wherein the second receiver is switched for connection to the first antenna section, said first and second receivers being tuned to different RF channel sets, said fourth receiver is switched for connection to the third antenna section, wherein the third and fourth receivers are respectively tuned to said different RF channel sets to which the first and second receivers are tuned.

* * * * *